United States Patent
Watson

(10) Patent No.: US 7,599,326 B2
(45) Date of Patent: Oct. 6, 2009

(54) METHOD FOR DISTRIBUTING A SET OF DATA, RADIOCOMMUNICATION NETWORK AND WIRELESS STATION FOR IMPLEMENTING THE METHOD

(75) Inventor: Mark Watson, London (GB)

(73) Assignee: Alcatel Lucent, Paris (FR)

( * ) Notice: Subject to any disclaimer, the term of this patent is extended or adjusted under 35 U.S.C. 154(b) by 682 days.

(21) Appl. No.: 10/980,721

(22) Filed: Nov. 3, 2004

(65) Prior Publication Data
US 2005/0094659 A1    May 5, 2005

(30) Foreign Application Priority Data
Nov. 3, 2003   (EP) .................................. 03292737

(51) Int. Cl.
H04L 12/28   (2006.01)
H04J 3/16   (2006.01)
(52) U.S. Cl. ..................... 370/329; 370/432; 370/465
(58) Field of Classification Search ................ 370/432, 370/238, 400, 465, 485; 375/296
See application file for complete search history.

(56) References Cited

U.S. PATENT DOCUMENTS

| | | | |
|---|---|---|---|
| 6,021,158 A * | 2/2000 | Schurr et al. ................ 375/211 |
| 2005/0009523 A1 * | 1/2005 | Pekonen ..................... 455/436 |

* cited by examiner

*Primary Examiner*—Sam Bhattacharya
(74) *Attorney, Agent, or Firm*—Sughrue Mion, PLLC

(57) ABSTRACT

The invention proposes a method of distributing a set of data to at least one wireless station (1), from a radiocommunication network (2) with multicast capabilities, through at least one base station (12-13), said distribution being performed to at least one multicast group joined by said at least one wireless station. The method comprises the steps of:
forming at least one data stream, by encoding a data source with a rateless erasure code;
transmitting, through the at least one base station, the at least one data stream to at least one respective multicast group; and
for each base station, adapting the transmission rate of at least some of the data streams, depending on an available capacity of said base station.

11 Claims, 1 Drawing Sheet

Figure 1:
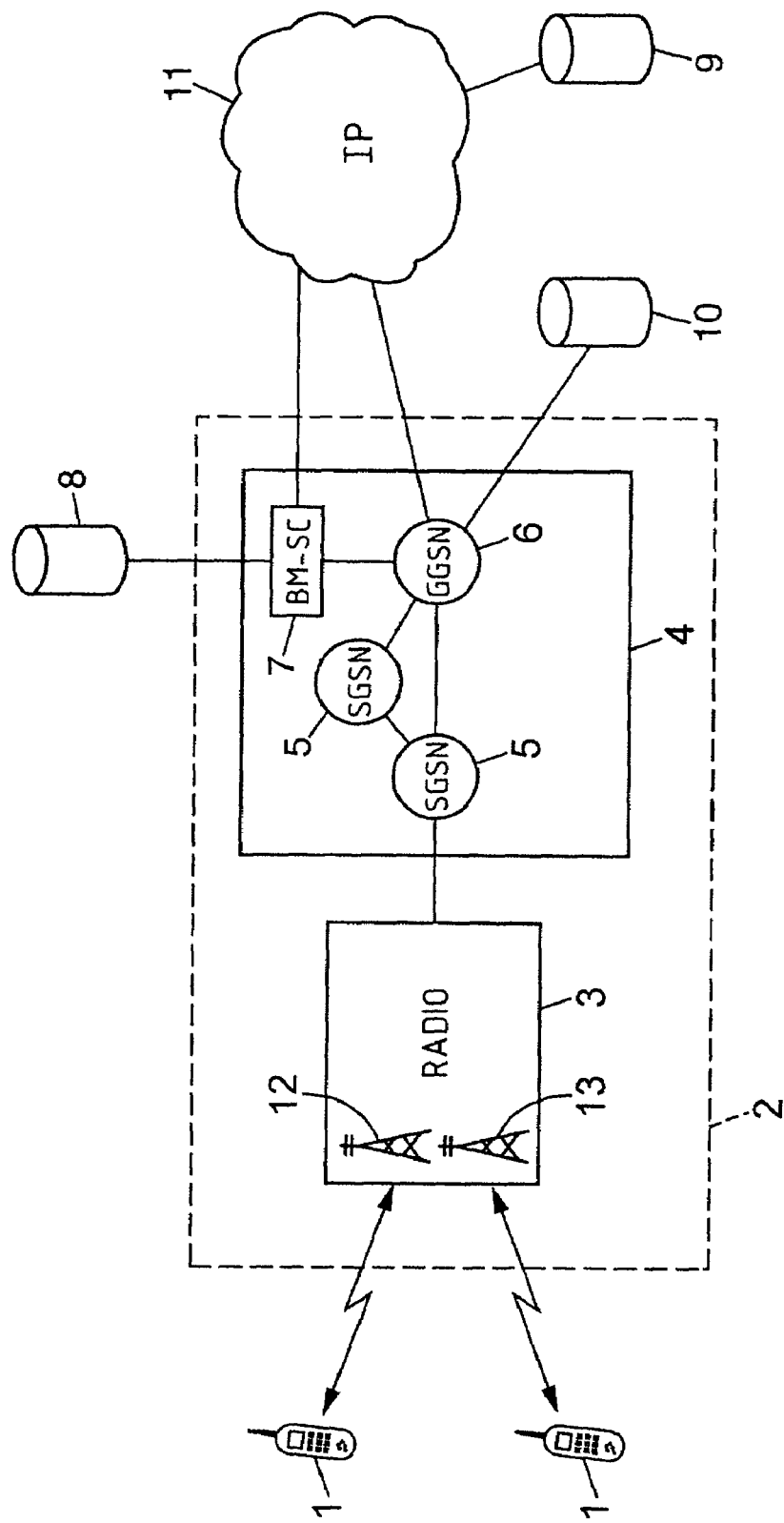

METHOD FOR DISTRIBUTING A SET OF DATA, RADIOCOMMUNICATION NETWORK AND WIRELESS STATION FOR IMPLEMENTING THE METHOD

The present invention relates to the distribution of a set of data from a radiocommunication network with multicast capabilities.

The multicast distribution of a set of data, e.g. for a file transfer, in a radiocommunication network is a complex matter, since some of the base stations that relay the data to wireless stations within their respective coverage area, may have different available capacities at a given time. Moreover, those available capacities may change over time as services compete for capacity.

However, it would be very difficult and inefficient to adapt at the data source to the conditions relative to each base station. In particular, this would require separate data streams from the source, with different data rates, to each base station, which removes a main advantage of using multicast. Besides, when congestion conditions change for a base station, or when a wireless station moves, the wireless station may receive different streams, with different data rates, which may result in loss or repetition of data.

Moreover, it is known to distribute data while controlling congestion of a sender, based on receiver selection of appropriate multicast streams. For this purpose, rateless erasure codes can be used to allow the sender to generate a constant stream of data packets based on a data file to be transmitted. This packet stream has no particular endpoint and has the property that from any portion of it, consisting of slightly more packets than the original source data file, the receiver can reconstruct the original file with high probability. That is, it does not matter which packets from the stream a receiver receives, just that it receives enough of them.

Such rateless erasure codes can be used with a 'layered' distribution scheme to support simple congestion control. This prior art is developed in the Internet domain, especially by the IETF (Internet Engineering Task Force): see, in particular, RFC 3451 ("Layered Coding Transport (LCT) Building Block", published in December 2002), RFC 3452 ("Forward Error Correction (FEC) Building Block" published in December 2002) and RFC 3450 ("Asynchronous Layered Coding (ALC) Protocol Instantiation", published in December 2002). In this scheme, the coded data is spread over several multicast streams, and users, on receiver side, choose how many streams to join or leave in order to match the data reception rate to that which can be efficiently supported on the route from sender to receiver. Therefore, the choice of which layers to receive, and therefore the responsibility for congestion control, is with the individual receivers.

However, in contrast to IP ("Internet Protocol") networks, joining and leaving multicast groups is a complex process in a radiocommunication network, e.g. a UMTS ("Universal Mobile Telecommunication System") or a GSM ("Global System for Mobile communications") network, involving multiple operations in some network elements. Moreover, different receivers in communication with the same base station may make different selections of multicast groups, or may not be well synchronised in their changes of selection, resulting in inefficient duplication of data on the radio. It thus can be understood that the above mentioned technical solution developed by the IETF does not scale well in a radiocommunication context.

An object of the present invention is to overcome the foregoing drawbacks, while proposing a multicast distribution adapted to radiocommunication networks and taking into account the capacity conditions of each sender.

Another object of the invention is to have a multicast distribution transparent to the distribution source.

The invention proposes a method of distributing a set of data to at least one wireless station, from a radiocommunication network with multicast capabilities, as set out in claim 1.

Other aspects of the invention relate to a radiocommunication network with multicast capabilities, a wireless station and a base station as set out in claims 9 to 11 respectively.

Thanks to the rateless erasure codes properties, a wireless station can reconstruct the distributed set of data even if the data streams transmission rate is downgraded because of a congestion situation for a given base station.

For example, the set of data, e.g. a file, can be reconstructed from only one multicast group with a top priority level if the base station is in or is coming to a congestion situation, and from a large number of multicast groups when the available capacity of said base station is high. It can also be reconstructed from a single multicast group, with a maximum rate when the available capacity of the corresponding base station is high, or with a downgraded rate when the base station is in a congestion situation.

The only thing which will change, depending on the number of multicast groups used to distribute the data streams or on the transmission rate of the data streams, is the time needed to reconstruct the file. Indeed, a sufficient quantity of data must be received in order to recover the entire file. As a first wireless station receiving data from a congested base station will be provided with a transmission rate less than the one for a second wireless station receiving data from a base station with available capacity, the first wireless station will be able to recover the file only later than the second wireless station. But an important point is that the file will be finally recovered by both wireless stations with the same quality level.

Moreover, the radiocommunication network is responsible for the congestion control, so that it decides which data streams must be distributed, while adapting the transmission rate in relation with each base station. The wireless stations thus do not have an active role in the congestion control mechanisms proposed by the invention.

Other features and advantages of the present invention will become apparent in the following description of non-limiting exemplary embodiments, with reference to the appended drawings, in which FIG. 1 is a block diagram of a system suitable for implementing the invention.

Wireless stations 1 communicate with a radiocommunication network 2, comprising a radio access network 3 having a plurality of base stations 12-13, and a core network 4 capable of transmitting data. Although the invention can take place in any system having such entities, it will be described hereinafter in a particular embodiment of a UMTS system, without restricting the scope of the disclosure.

In this context, the mobile wireless stations 1 are called UEs ("User Equipment"), the radio access network 3 of the UMTS network is called UTRAN ("Universal Terrestrial Radio Access Network"), the base stations 12-13 are called Nodes B, and the core network 4 comprises interconnected switches called SGSN ("Serving GPRS Support Nodes"), some of which being connected to the UTRAN, and GGSN ("Gateway GPRS Support Node"). The GGSN 6 is a gateway for interfacing the UMTS network with external data networks, e.g. an IP ("Internet Protocol") network 11.

Servers 8-10 are arranged for providing data for multicast services to UEs 1 having corresponding subscriptions. The services rendered can be of various types. In the following, we will more particularly consider services of the family referred to as MBMS ("Multimedia Broadcast/Multicast Service"), which is currently developed and standardized by the 3GPP. A description of its architecture and functionalities can be found in the technical specification TS 23.246, v.0.4.0, "MBMS; Architecture and Functional Description (Release 6)", published in February 2003 by the 3GPP. MBMS enables a subscriber UE to receive data through a UMTS network in particular after having been informed of the start of a broadcast/multicast transmission.

MBMS uses a specific core network unit called BM-SC 7 ("Broadcast/Multicast Service Centre"), which is responsible for service provisioning and delivery. The BM-SC is typically connected to a GGSN 6 as shown in FIG. 1.

The services using the MBMS mode of delivery can be rendered by using servers 8-9 connected directly or via an external network 11 to the BM-SC 7. If a UE 1 has a subscription with a particular service of the MBMS type (e.g. broadcast of thematic information, like sport results, stock information, event notification, etc.), the corresponding server 8-9 is arranged to send data to the BM-SC 7, so that it is broadcast or multicast to the attention of the subscriber stations. The UE 1 is also able to receive the broadcast or multicast data, since it has a subscription with such service.

In the following, we consider that the servers 8-10 are data sources and that the service to be carried out is a multicast distribution of a set of data from such servers. In particular, the set of data can be advantageously a file or any set of data for which a real-time transfer is not required.

When a file is to be transferred to UEs 1 having a corresponding subscription, it is first encoded with a rateless erasure code. Such code is also known as 'Expandable FEC' ("Expandable Forward Error Correction"). Different rateless erasure codes are known, some of which are called 'LT codes' and are described in the proceedings of the 43rd Annual IEEE (Institute of Electrical and Electronics Engineers) Symposium on Foundations of Computer Society (FOCS'02) published in 2002. Another example of rateless erasure codes is known as 'online codes'.

Such encoding of the source data file generates a constant data stream of packets. This packet stream has no particular endpoint and it is possible to reconstruct the original file with a high probability, when decoding any significant portion of the stream, i.e. any portion consisting of slightly more packets than the original source data file.

In a first embodiment of the invention, the data stream is associated with a single multicast group. Upon transmission of the data stream to the multicast group, each UE 1 having joined this group and having a subscription for the file transfer service is capable of receiving and decoding said data stream. The transmission of the data stream to the single multicast group is performed over a respective radio bearer in relation with each Node B. Referring to FIG. 1, if the UE 1 communicating with the Node B 12, has a subscription for receiving the file transfer by multicast, it will receive the data stream over one radio bearer. If the other UE 1, communicating with the Node B 13, has a subscription for receiving the file transfer by multicast, it will receive the data stream over another radio bearer.

Each radio bearer in relation with a Node B can bear a transmission rate between a minimum and a maximum bit rate. The transmission rate over each radio bearer is adapted depending on the current capacity of the related Node B. For example, if the Node B 12 has a large available capacity, the maximum bit rate can be used for the transmission of the data stream. In this way, the receiving UE can receive the data stream that has been generated from the original file, within a short period of time. Moreover, since only a portion of the encoded data is needed in order to reconstruct the original file, such portion will be entirely received after only a short period of time, which helps the UE to decode the received data and to reconstruct the file relatively quickly.

On the contrary, let us consider that the Node B 13 is congested (i.e. it has no available resource at a given time) or is coming to a congestion situation (which means that it has not enough available resource to serve a new traffic, possibly with a higher priority than the one used for the file transfer). If such a congestion situation is detected in the radio network for a given Node B, a reduction of the transmission rate over the corresponding radio bearer can be performed, provided that the transmission rate is still above the minimum bit rate defined for this radio bearer. This downgrading of the radio bearer is performed for example by dropping, e.g. randomly, some packets of the data stream. It can be executed by the Node B itself or by a controller controlling the Node B.

The UE 1 receiving data from the Node B 13 thus receives a subset of the transmitted stream, which has no harmful consequence since it is generally capable of reconstructing the original file from such a subset, due to rateless erasure codes properties. Moreover, since this UE 1 receives data with a transmission rate less than the maximum bit rate, and since the reception of a certain number of packets is needed for reconstructing the original file, it thus takes a longer time period to this UE 1 to be able of reconstructing the file than for the UE 1 receiving data from the non congested Node B 12.

From this example, it can thus be understood that the file transfer is performed with no impact at the data source. Only the data rate of the radio bearer relative to a congested Node B is modified for allowing the serving of new traffic through this Node B. This congestion control method is made by the network which prevents from the above mentioned drawbacks. Finally, the only consequence of the transmission rate reduction over some radio bearers is that the reception time of a sufficiently large number of packets to reconstruct the original file may differ between the radio bearers, according to the number of available resources of the corresponding Nodes B.

It can also be understood that even if several radio bearers are used in each cell to carry the data stream, a similar adaptation of the transmission rate can be performed for one or several of the radio bearers.

In a second embodiment of the invention, the data source is spread over several data streams coded with a rateless erasure code. The data streams are mapped onto respective multicast groups, according to a 'layered' distribution scheme, in which each multicast group corresponds to a layer. It must be noted that the data of each stream has an equal importance, since they all consist of a portion of the original file, from which the latter can be reconstructed after decoding.

Each multicast group is assigned a priority level. In the advantageous situation where each data stream associated with a multicast group is transmitted over a corresponding radio bearer in relation with each Node B, the priority level is actually assigned to the radio bearer by the radio part 3 of the network. If a multicast group (or the corresponding radio bearer) is assigned a top level priority, this means that the radio network can not remove the corresponding radio bearer. Such priorities are thus not an indication of an importance of the data streams, which is actually equal between the data streams, but a guarantee of a minimum transmission rate via a minimum number of top priority multicast groups (or corresponding radio bearers).

In the example illustrated in FIG. 1, the UE 1 communicating with the Node B 12, receives the generated data streams on respective radio bearers and the other UE 1, communicating with the Node B 13, receives the generated data streams on other respective radio bearers. The reception and the decoding of the received packets are carried out by the UEs 1, until they are able to reconstruct the original file.

As long as a Node B does not reach its maximum capacity, that is to say that it still has enough available resources to be able to serve other traffic, it can transmit all the data streams to associated multicast groups.

But as soon as a congestion situation is detected for this Node B (i.e. if no more or too few resource is available for this Node B), the radio network 3 removes the radio bearers corresponding to multicast groups with a non top priority level. The removal of radio bearers is performed according to the assigned priority levels, which means that the first radio bearers to be removed will be the ones with the lowest priority level. Alternatively, the radio bearers are not removed, but their transmission rate is reduced, according to the assigned priority levels.

The UEs receiving the multicast from such a congested Node B thus receives only a subset of the transmitted data, corresponding to a restricted number of data streams. This is not a problem to reconstruct the original file, due to the rateless erasure codes properties. But, it results in a longer time period for receiving the sufficiently high number of packets to be able to reconstruct the original.

For example, if Node B 12 has much available capacity and Node B 13 is congested, the UE 1 communicating with the Node B 12 will receive data streams from the maximum number of multicast groups, whereas the other UE 1, communicating with the Node B 13 will receive data streams from only a limited number of the multicast groups, according to the assigned priority levels. The first UE will thus reconstruct the original file with the same quality as the second UE, but in a quicker way.

This second embodiment of the invention has good advantages. For example, when several services using a multicast transmission have to be rendered, they can be classified so that they correspond to different multicast groups. So, a service can be degraded or even suppressed, before another service is degraded at all. On the contrary, all the services would be equally and simultaneously degraded when using a single radio bearer for carrying all the services.

Moreover the second embodiment of the invention allows managing the radio bearers in a different way. For example, a higher transmission power can be used over the radio bearers corresponding to multicast groups with a high priority level.

When a UE has received enough packets to reconstruct the file, it can leave the multicast groups it had joined initially, or it can notify it directly to the network or the data source. The source stops sending when all the subscribers of the file transfers have left the multicast groups or notified the network or the source. The source can also stop sending after a predetermined period of time.

The invention claimed is:

1. A method of distributing a set of data to at least one wireless station, from a radiocommunication network with multicast capabilities, through at least one base station, said distribution being performed to at least one multicast group joined by said at least one wireless station, the method comprising the steps of:
   forming at least one data stream, by encoding a data source with a rateless erasure code;
   transmitting, through the at least one base station, the at least one data stream to at least one respective multicast group; and
   for each base station, adapting the transmission rate of at least some of the data streams, depending on an available capacity of said base station.

2. A method as claimed in claim 1, wherein the adaptation of the transmission rate of at least some of the data streams for a base station comprises the reduction of said transmission rate when the base station is congested.

3. A method as claimed in claim 1, wherein the adaptation of the transmission rate of at least some of the data streams for a base station comprises the reduction of said transmission rate when the available capacity of the base station is insufficient for serving a new traffic.

4. A method as claimed in claim 1, wherein the at least one data stream is transmitted through each base stations in the form of data packets, and wherein the adaptation of the data transmission rate for a base station comprises the step of dropping data packets of at least some of the data streams.

5. A method as claimed in claim 1, wherein one data stream is formed and is transmitted to a respective multicast group through the at least one base station, and wherein the adaptation of the transmission rate of the data stream for a base station comprises the step of downgrading a radio bearer carrying the transmission in relation with said base station.

6. A method as claimed in claim 1, wherein at least two data streams are formed and are transmitted to at least two respective multicast groups, over at least two respective radio bearers in relation with each base station, wherein a priority level is assigned to each one of the radio bearers in relation with the corresponding multicast group, and wherein the adaptation of the transmission rate of at least some of the data streams for a base station comprises the step of removing or downgrading at least one of the radio bearers related to said base station, depending on its assigned priority level.

7. A method as claimed in claim 1, wherein the rateless erasure code is at least one among an LT code and an online code.

8. A method as claimed in claim 1, wherein the distributed set of data is at least one file.

9. A radiocommunication network with multicast capabilities, arranged for distributing a set of data to at least one wireless station, through at least one base station, said distribution being performed to at least one multicast group joined by said at least one wireless station, the method comprising the steps of:
   forming at least one data stream, by encoding a data source with a rateless erasure code;
   transmitting, through the at least one base station, the at least one data stream to at least one respective multicast group; and
   for each base station, adapting the transmission rate of at least some of the data streams, depending on an available capacity of said base station.

10. A wireless station comprising means for receiving at least one data stream from a radiocommunication network with multicast capabilities, means for decoding the at least one data stream with knowledge of a rateless erasure code the data streams are encoded with, and means for reconstructing a set of data from the decoded at least one data stream, the set of data being distributed to the wireless station according claim 1.

11. A base station for use in a network with multicast capabilities, arranged for distributing a set of data to at least one wireless station, said distribution being performed by said network to at least one multicast group joined by said at least one wireless station, the base station comprising:
   means for receiving at least one data stream for transmission to at least one respective multicast group; and
   means for adapting the transmission rate of at least some of the data streams, depending on an available capacity of said base station.

* * * * *

UNITED STATES PATENT AND TRADEMARK OFFICE
CERTIFICATE OF CORRECTION

PATENT NO. : 7,599,326 B2
APPLICATION NO. : 10/980721
DATED : October 6, 2009
INVENTOR(S) : Mark Watson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1341 days.

Signed and Sealed this

Twenty-eighth Day of September, 2010

David J. Kappos
*Director of the United States Patent and Trademark Office*